(12) United States Patent
Heudorfer et al.

(10) Patent No.: US 6,210,519 B1
(45) Date of Patent: Apr. 3, 2001

(54) METHOD OF MANUFACTURING AN AIRBAG

(75) Inventors: Benedikt Heudorfer, Nersingen; Oliver Gloecker, Weidenstetten; Heinrich Einsiedel, Ulm; Uwe Klaiber, Heidenheim, all of (DE)

(73) Assignee: Takata (Europe) Vehicle Safety Technology GmbH (DE)

(*) Notice: Subject to any disclaimer, the term of this patent is extended or adjusted under 35 U.S.C. 154(b) by 0 days.

(21) Appl. No.: 09/150,100

(22) Filed: Sep. 9, 1998

(30) Foreign Application Priority Data

Sep. 9, 1997 (DE) .............................. 197 39 558

(51) Int. Cl.⁷ .......................... B32B 31/12; B32B 31/24; B32B 31/26; B60R 21/16
(52) U.S. Cl. ...................... 156/292; 280/728.1; 280/729; 428/35.2
(58) Field of Search .................. 156/93, 292, 310, 156/313; 280/728.1; 428/35.2

(56) References Cited

U.S. PATENT DOCUMENTS

| | | | |
|---|---|---|---|
| 5,480,181 | 1/1996 | Bark et al. | 280/730.2 |
| 5,833,265 | * 11/1998 | Seymour | 280/743.1 |
| 5,909,895 | * 6/1999 | Iino et al. | 280/743.1 |

FOREIGN PATENT DOCUMENTS

| | | |
|---|---|---|
| 40 28 637 | 3/1992 | (DE) . |
| 41 42 884 | 7/1992 | (DE) . |
| 41 24 506 | 1/1993 | (DE) . |
| 43 21 311 | 1/1995 | (DE) . |
| 195 05 507 | 8/1996 | (DE) . |
| 296 14 201 U | 11/1996 | (DE) . |
| WO 95/12504 | 5/1995 | (WO) . |
| WO 95/21753 | 8/1995 | (WO) . |

\* cited by examiner

*Primary Examiner*—Michael W. Ball
*Assistant Examiner*—Jessica Rossi
(74) *Attorney, Agent, or Firm*—Foley & Lardner

(57) ABSTRACT

The invention relates to a method of manufacturing an airbag which consists of a plurality of airbag parts and has an airbag envelope. In the method at least one airbag part is provided at least regionally with a polyurethane coating through the heating of which the airbag part can be welded to a further airbag part.

23 Claims, 3 Drawing Sheets

FIG. 1a
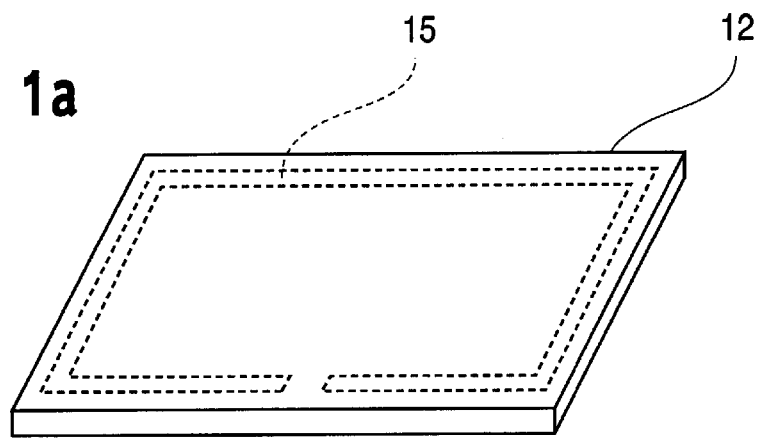
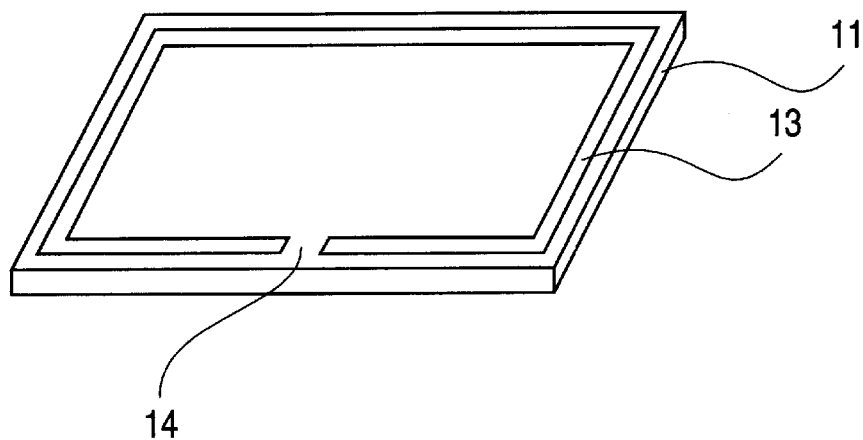
FIG. 1b
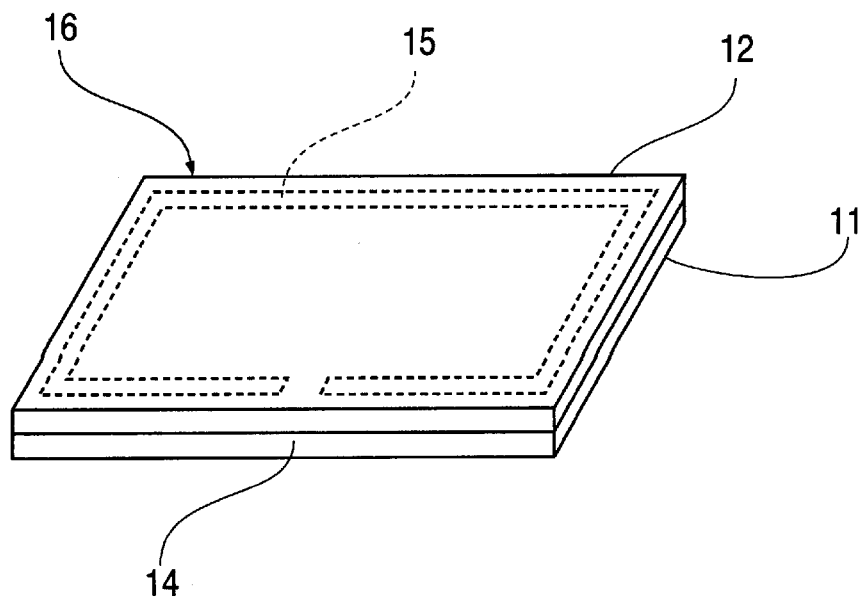

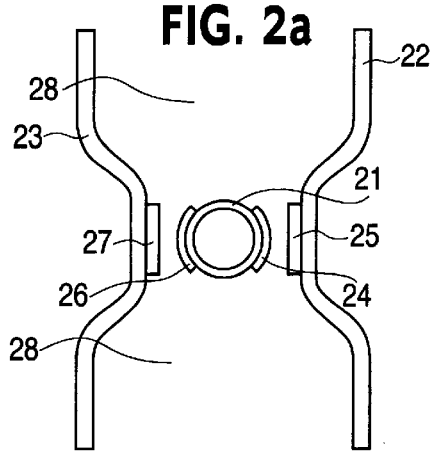
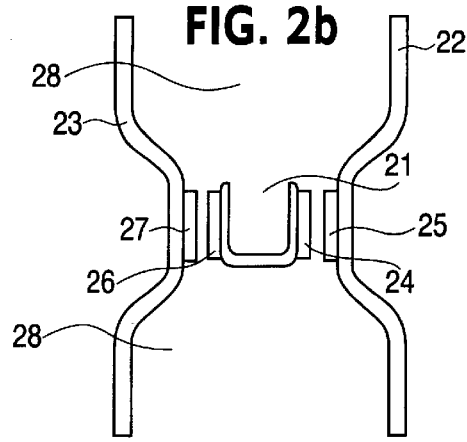
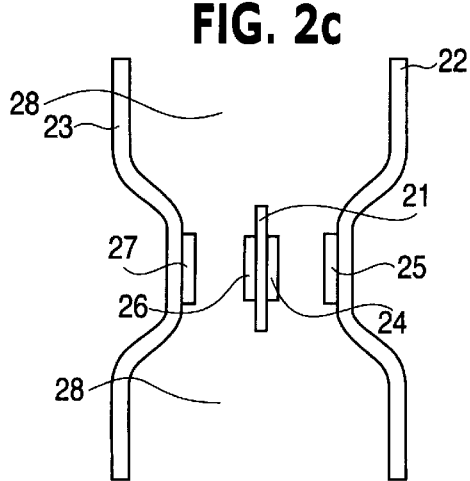
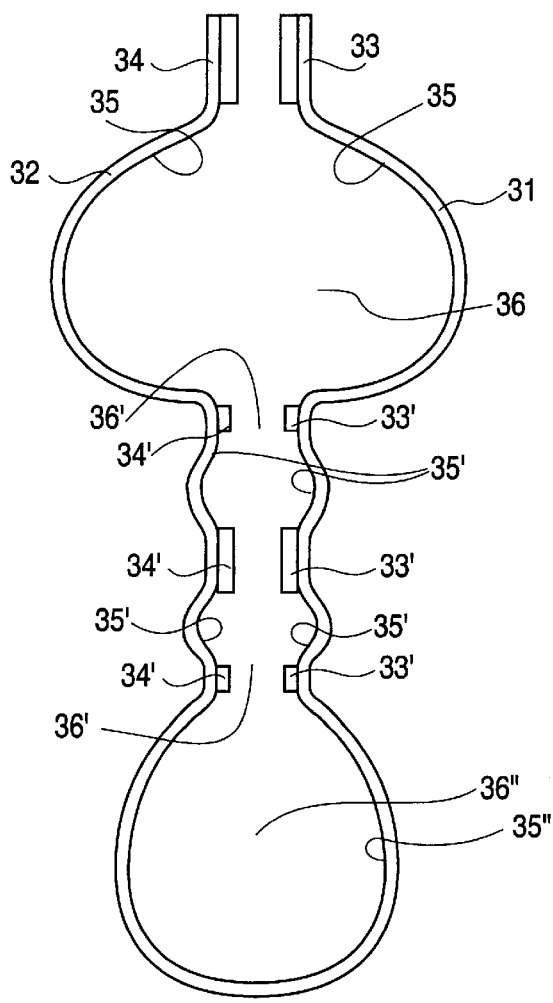

METHOD OF MANUFACTURING AN AIRBAG

The invention relates to a method of manufacturing an airbag which comprises as plurality of airbag parts and has an airbag envelope.

Such airbags serve as a safety device for the driver and passengers in motor vehicles. If a retardation sensor detects an impact of the vehicle, or an impact of an object on the vehicle, then an associated gas generator brings about an inflation of the airbag, so that the inflated airbag arrests resulting movements of the vehicle occupants, or protects the vehicle occupants from an object penetrating into the vehicle. For the manufacture of such an airbag a plurality of parts of the same are for example connected together by sewing or by adhesive bonding. The connection of the airbag parts must be sufficiently strong to withstand an abrupt inflation by the gas generator, or an additional pressure loading through the impact of an object. The parts which form the actual airbag envelope to be inflated and also their points of connection must be sufficiently well sealed with respect to the gas given off by the gas generator. In order to satisfy these requirements with high reliability, known airbag manufacturing methods are comparatively complicated and correspondingly expensive.

SUMMARY OF THE INVENTION

It is the object of the invention to provide a method of the initially named kind which is simple and reliable to carry out and which ensures the strength and the gas tightness of the points of connection of the airbag with a high degree of safety and by which an airbag is provided which further enhances the safety of the vehicle occupants in comparison to known airbags.

This object is satisfied in accordance with the invention in that a first airbag part is provided during a preparation stage with a polyurethane coating at at least one attachment section, and in that the attachment section of the first airbag part is brought into contact with a connection section of a second airbag part during a manufacturing stage and the first airbag part is connected through heating of the polyurethane coating of its attachment section to the second airbag part along its connection section.

In accordance with the invention it is only necessary for the manufacture of a connection of two airbag parts to one another to coat the first airbag part with polyurethane (PU) at at least one attachment section, to align the second airbag part relative to this coating or to the first airbag part and to heat the PU-layer, so that the two airbag parts are welded to one another along the attachment section. This connection of the two parts along the attachment section proves to be sufficiently gas-tight and also adequately strong with resistance to tension and tearing. Thus, the need to provide an adhesive or binding means at the attachment section of the first airbag part, which is only allowed to be brought into contact with the second airbag part at the connection section is avoided. It is also not necessary to sew together two airbag parts which are to be connected to one another, or to seal corresponding seams, so that they are gas-tight. The method of the invention can be advantageously used on all parts of the airbag which are to be connected to one another, even though only two or three airbag parts are named and defined in the following.

It is possible that said first airbag part and said second airbag part are each formed as a section of the actual airbag envelope, so that two sections of the airbag envelope can be connected to one another through the method of the invention. It is furthermore of advantage when a single envelope section consists of two airbag parts which are connected to one another through the method of the invention. By way of example this airbag envelope section can be folded such that the two airbag parts come to lie above one another. In this case a connection location of the two airbag parts is already given by the fold of the envelope section.

Alternatively, it is possible for the first said airbag part to be formed as a connection band and for the second airbag part to be formed as a section of the airbag envelope. This connection band can be provided to extend within the inner space of the finished airbag, for example in order to stabilise the inflated airbag in its shape or alignment. For side-airbags in particular, which are to adopt a position between a passenger and the sidewall of the vehicle in the inflated state, a connection band can be provided inside the airbag which connects the airbag envelope section adjacent the passenger to the airbag envelope section adjacent the side wall along the longitudinal direction of the airbag. In this way the width of the airbag, i.e. the spacing of the two said airbag envelope sections, can be restricted.

In this embodiment of the invention it is preferred to simultaneously connect the connection band to a third airbag part simultaneously with its connection to the said airbag envelope section, in particular to a further section of the airbag envelope, so that the connection band is connected after the end of the method between the said airbag envelope section and the third airbag part. For this, the connection band is coated with PU at a further attachment section during the preparation stage and this further attachment section is brought into contact with a connection section of the third airbag part during the manufacturing stage and heated in order to produce a connection between the attachment section and the connection section of the third airbag part. In this embodiment of the invention it is also possible to provide the second airbag part and the third airbag part as parts of a single section of the airbag envelope, for example in order to attach the connection band between the two parts of the folded airbag envelope section.

The connection band can be executed as a hose, so that it has a substantially round cross-section. In this respect, it is of advantage when the coating which is respectively provided as the attachment section extends along the length of the connection band at two oppositely disposed outer sides of the hose. It can be advantageous, in dependence on the type of construction of the airbag provided, for the hose-like connection band to be closed or open at its longitudinal ends, with it in particular being possible to provide the two longitudinal ends with a PU-coating at their inner sides and to connect them in their own right in the course of processing step, so that they are closed.

Furthermore, it is possible for the connection band to have a substantially U-shaped cross-section. In this case the PU-coating, which is respectively provided as the attachment section, can extend at the outer sides of the limbs of the U-shape over the length of the connection band.

Finally it is also possible to form the connection band as a flat band in which both sides are respectively coated with PU as an attachment section.

In the method of the invention it is basically sufficient to coat the region of the first airbag part termed an attachment section with PU in order to firmly connect the first airbag part to a further airbag part by heating of this coating along the attachment section. At the further airbag part the connection is produced along a section, which is presently termed the connection section, which does not require any special constructional design or treatment.

In the context of the invention it is preferred to provide other regions of the named airbag parts than the attachment section of the first airbag part with a polyurethane coating. In particular, the second airbag part and optionally the third airbag part can each be coated at their region termed a connection section, so that during the processing step a coated attachment section is welded to a coated connection section. In this way, an even higher strength of the connection is achieved.

If the airbag parts are coated with PU during the preparation step, so that the entire inner side of the finished manufactured airbag envelope has a PU coating, then the method of the invention not only produces a connection of the airbag parts, but rather also ensures the gas-tightness of the entire airbag at and also between the connection sections.

It is preferred when the airbag parts are coated over the full area with PU during the preparation step at at least one side, and indeed at the side having the attachment section or the connection section. In this way the airbag parts can be connected to form a gas-tight airbag, with the full area coating taking place in a particularly simple manner during the preparation stage.

The heating of the PU layer, which is located during the manufacturing step between an attachment section and a connection section, can take place by direct heat transfer, for example, by bringing a source of heat into contact with the attachment section, the connection section or the airbag part contacting it, so that heat is transferred from the heat source to the PU-layer, or to regions of it, by thermal conduction or in the form of radiation. It is also possible to heat the PU-layer by ultrasonic waves or by high frequency alternating electrical fields (dielectric heating); in this way contact-free and targeted heating is possible.

It is of advantage when pressure is exerted onto the first and second airbag parts and also optionally onto the third airbag part during the manufacturing step. In particular, if the PU-layer is only applied to the attachment sections, or to the connection sections, then the pressure can be used in a simple manner over a large area beyond the attachment sections or the connection sections. If further regions of the airbag are coated with PU, then it is preferred only to exert the pressure along the connection sections.

The airbag parts are preferably manufactured of a synthetic fabric material, such as for example polyamide, Nylon PA66, Nylon PA46 or polyester.

The invention also relates to an airbag which is manufactured in accordance with one of the above described methods.

An airbag or its envelope manufactured in accordance with one of the above described methods can have two parts which are connected to one another along a plurality of connection sections which extend at least regionally parallel to one another and are spaced apart from one another. In this respect it is possible to make the connection sections which extend parallel to one another of different widths. In this way a narrow connection section can act as a seam which is intended to tear, whereas the width of an adjacent parallel connection section can be so dimensioned that this is also able to withstand high loadings.

Through a design of an airbag of this kind with a connection section, forming a seam which tears, it is thus possible to achieve a controlled increase in the volume of the inflated airbag, in order, for example in the case a gas pressure which is too high within the airbag, or in the case of a high pressure load from the outside through the impact of a passenger or an article, to take precautions against the unintended tearing open of the airbag envelope or of a point of connection between parts of the airbag. A design of the airbag with such a seam intended to tear is also advantageous if the airbag is manufactured by a method other than the invention, for example by the sewing together of the airbag parts.

The two parallel connection sections, or an individual connection section of an airbag manufactured in accordance with the invention, can extend along a closed track, for example in the shape of a circle or of polygon. Through such a closed connection section it is possible to close off a surface region between two airbag parts connected together in a gas-tight manner, so that on the inflation of the finished manufactured airbag no gas can flow into this region. This region of the airbag can serve as an interception area, by which the occupants or objects within the vehicle are intercepted, or which transmits the tensile stresses between two adjacent inflated regions of the airbag without having to take up its own gas volume for this purpose.

An airbag in accordance with the invention is further characterised in that two airbag parts are connected to one another along a connection section which has substantially the shape of a bone or of a part thereof. With such a shape, the contour of the connection section always extends with large radii of curvature. An elongate connection section thus does not terminate as a point, as a corner or as a sharp curve, but rather broadens to a substantially circular termination of its longitudinal end. The radius of this circle is then, for example, twice as large as the width of the remaining elongate connection section. In this way tensile forces and tearing forces acting at the connection section are reduced or redirected and distributed, so that a tearing of the connected airbag parts or of the welded connection is effectively prevented.

Through the design of an airbag with bone-like or part-bone-like connection sections, it is possible to bring about a segmentation of the airbag into chambers, for example in order to prevent an undesired inflation of an elongate airbag shape. A design of an airbag with connection sections in the form of a half bone is of advantage when a segmentation of this kind is to take place close to a boundary of the airbag. In this case, the end of the connection section projects in the shape of a bone head in the direction of the centre of the airbag, whereas its oppositely disposed end opens into the boundary of the airbag.

Further preferred embodiments are described in the subordinate claims.

BRIEF DESCRIPTION OF THE DRAWINGS

The invention will be described in the following with reference to embodiments and to the drawings in which are shown:

FIGS. 1a and 1b respective schematic perspective views of two airbag parts which are to be connected together and which are connected together, FIGS. 2a, 2b and 2c schematic sectional illustrations of two airbag envelope sections to be connected together between each of which there is arranged a connection band having a circular, U-shaped and flat cross-section respectively, FIG. 3 a schematic sectional illustration of two airbag parts with a plurality of connection and attachment sections extending parallel to one another, FIG. 4 a schematic perspective view of two airbag parts with a rectangular attachment section, and FIGS. 5a and 5b schematic perspective views of two airbag parts with attachment sections in the form of a bone and of a half bone respectively.

DETAILED DESCRIPTION

Figure 4:
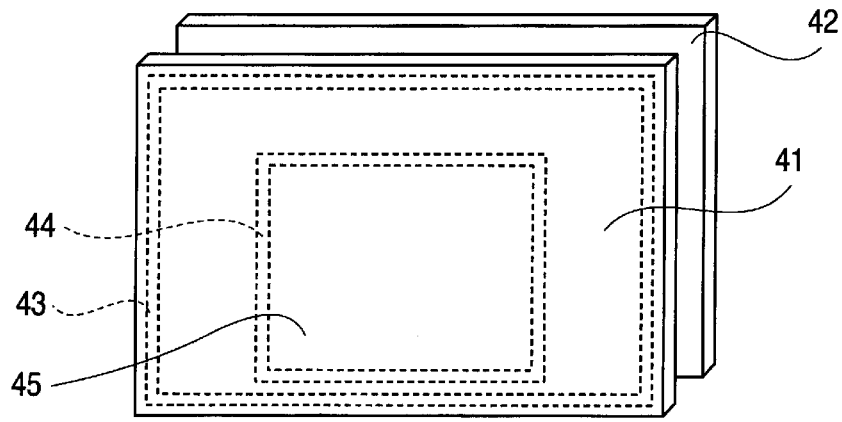

FIGS. 1a and 1b show schematically a first airbag part 11 and a second airbag part 12 which are formed as flat rectangular sections of the envelope of the airbag to be manufactured and which are of the same size. FIG. 1a shows how the second airbag part 12 is arranged above the first airbag part 11 after completion of the preparatory step. In FIG. 1b it is shown how the two airbag parts 11, 12 contact one another during the manufacturing step.

The lower airbag part 11 has at its upper side an attachment section 13 which extends along the marginal regions of the airbag part 11. In the direction towards the centre of the airbag part 11, the attachment section 13 always has an extent which is substantially less than the extent of the airbag part 11 in this direction. The attachment section 13 is closed apart from an inflation opening 14 pointing in the direction of the viewer.

The upper airbag part 12 has at its lower side a connection section 15 which has the same shape and extent as the confronting attachment section 13. In FIGS. 1a and 1b the connection section 15 is shown in broken lines.

In order to manufacture in accordance with the invention an airbag having the two airbag parts 11, 12, the lower airbag part 11 is first provided at the attachment section 13 with a polyurethane coating. Subsequently, the two parts 11, 12 are placed on top of one another, shown in FIG. 1b, in such a way that the connection section 15 contacts the attachment section 13. Thereafter, the PU-coating is heated so that the two airbag parts 11, 12 are connected together along the attachment section 13, i.e. the connection section 15. In this way, an inflatable volume region inflatable via the inflation opening is enclosed by the two airbag parts 11, 12 along the attachment section 13. The welding together of the two airbag parts 11, 12 can take place in a simple manner by hot areal pressing.

In accordance with the invention it is also possible to provide the upper airbag part 12 with a PU coating at its connection section 15 during the manufacturing step and to subsequently weld it in the named manner to the lower airbag part 11 during the manufacturing step. In this way the strength of the connection can be further enhanced.

Furthermore, it is also possible, in the context of the invention, to coat the entire upper side of the lower airbag part 11 and/or the entire lower side of the upper airbag part 13 during the processing step. During the processing step, the PU coating is this case heated only along the attachment section 13, and/or on the connection section 15, for the welding together of the parts 11, 12.

Finally, the two airbag parts 11, 12 can also be provided as parts of a single section of the envelope of the airbag to be manufactured by connecting them together at their sides 16 via a fold. In this case, the PU coating can be applied during the preparatory step over the full area at one side of the section. During the manufacturing step, the one part 12 is then folded over the other part 11 of the section such that the PU layer is located at the inner side of the fold. Thereafter the PU layer is heated as described above along the attachment section 13.

The FIGS. 2a, 2b and 2c each respectively schematically show a part of a section through three airbag parts 21, 22, 23. In this respect, the first airbag part 21 is in each case formed as a connection band which extends perpendicular to the plane of the paper. The second airbag part 22 and the third airbag part 23 are in each case of areal extent, are formed as a section of the envelope for the airbag to be manufactured and likewise have an extent perpendicular to the plane of the paper. The connection band 21 shown in FIG. 2a has a ring-like cross-section. The cross-section of the connection band 21 shown in FIG. 2b has the shape of a U, the limbs of which point parallel to the vertical extent of the illustrated section of the two airbag parts 22, 23. The cross-section of the connection band 21 shown in FIG. 2c and formed as a flat band extend parallel to the vertical extent of the two airbag parts 22, 23.

The respectively illustrated connection bands 21 in FIGS. 2a, 2b and 2c each have an attachment section 24 at their outer side confronting the second right-hand airbag part 22. Airbag part 22 has at its side confronting the connection band 21 a connection section 25 along the region adjacent to the connection band 21. Symmetrically hereto, the connection band 21 and the third left-hand airbag part 23 each have a further attachment section 26 and a connection section 27 respectively at their mutually confronting regions. The attachment sections 24, 25 and the connection sections 26, 27 extend along the connection band 21 in a direction perpendicular to the plane of the paper.

The connection bands 21 shown in FIGS. 2a, 2b and 2c serve for the spaced apart and regional connection of the two airbag envelope sections 22, 23. The two attachment sections 24, 26 of the connection band 21 are provided for this purpose during the preparatory step with a polyurethane coating. During the manufacturing step, the connection sections 25, 27 of the airbag parts 22, 23 are contacted with the attachment section 24, 26 respectively of the connection band 21 and are connected to the latter by the airbag parts 22, 23 are contacted with the attachment section 24, 26 respectively of the connection band 21 and are connected to the latter by heating of the PU coating. In this way, the airbag envelope sections 22,23 are connected to one another along their connection sections 25, 27 via the connection band 21. Inflatable volume regions 28 surrounded by the airbag envelope sections 22, 23 can thus adjoin the connection band 21 adjacent to the top and bottom thereof.

The method of the invention is simplified further when the entire outer side of the respective connection band 21 is provided with a PU coating, so that no distinction of a separate attachment section 24, 26 is necessary. In the same way, the entire side of the airbag part 22 and/or 23 confronting the connection band 21 can be provided with the PU coating during the preparatory step.

When compared with a connection of the two airbag parts 22, 23 without an intermediate connection band 21, the use of the flat connection band 21 shown in FIG. 2c has the advantage that, if only the attachment sections 24, 26 are coated, the position of the connection sections 25, 27 can be freely selected by corresponding positioning of the connection band 21 between the two airbag parts 21, 22.

In FIG. 3 a section through the envelope of an airbag to be manufactured is schematically shown. The envelope is formed in one piece and can be subdivided into a right-hand first airbag part 31 and into a left-hand second airbag part 32 symmetrically thereto. The two airbag parts 31, 32 are arranged adjacent to and spaced apart from one another and merge into an airbag envelope that is joined or folded on one side and has corresponding overlying edges to be sealed on the other sides. At the inner side of the airbag envelope to be manufactured, i.e. at the side of the right-hand part 31 facing the left-hand part 32 and at the side of the left-hand part 32 facing the right-hand part 31, attachment sections 33, 33', and connection sections 34, 34' provided for mutual bonding alternate with volume sections 35, 35', 35" at which no connection of the two parts 31, 32 is to take place.

At the upper side of the illustrated right-hand envelope part 31 a first broad attachment section 33 extends adjacent to the opening of the cross-section shown. Adjacent to and beneath this first attachment section 33 there is provided a volume section 35 at which the right-hand airbag part 31 is not intended for connection to the oppositely disposed part 32 with the width of the volume section amounting to a multiple of the first attachment section 33. This volume section 35 arches towards the outside, so that it bounds one half of an upper volume region 36 of a substantially round cross-section disposed between the two envelope parts 31, 32.

Three mutually parallel attachment sections 33' adjoin the volume section 35 of which the central one has approximately the width of the named first attachment section 33 and the two outer ones have a lesser width and are separated from one another by two small volume sections 35'. In the direction towards the left-hand envelope part 32 the two volume sections 35' each bound a replacement volume region 36' of a smaller cross-sectional area than the upper volume region 36.

A lower volume section 35" adjoins the lower outer attachment section 33' beneath it and surrounds a lower volume region 36" which has a substantially round cross-section with an area similar to that of the upper volume region 36.

At the left-hand airbag part 32 connection sections 34, 34' extend symmetrically to the attachment sections 33, 33' of the right-hand part 31 and also volume sections 35, 35', 35" extend symmetrically to the volume sections 35, 35', 35" of the right-hand part 31. At the connection of the two parts 31, 32 the lower volume section 35" of the right-hand part 31 merges into the lower volume section 35" of the lower part 32.

The attachment sections 33, 33', the connection sections 34, 34', the volume section 35, 35', 35" and the volume regions 36, 36', 36" extend in the same way as the envelope parts 31, 32 in a direction perpendicular to the plane of the paper.

FIG. 3 shows the initial state of the preparatory step of the manufacturing method in accordance with the invention: the illustrated airbag envelope is already coated at its entire inner side with polyurethane. Its right-hand part 31 is brought into contact with the connection sections 34 of the left-hand part 32 along the attachment sections 33. Thereafter, the attachment sections 33 and the connection sections 34 are heated, so that they are welded to one another. The two parts 31, 32 are also connected to one another at the two ends which are not shown in FIG. 3, but which extend in both directions perpendicular to the plane of the paper, with only an opening being provided in each case for the inflation of the upper volume region 36 and of the lower volume region 36".

In the finally manufactured and inflated state, the airbag shown has a cross-section similar to the representation in FIG. 3. The upper volume region 36 and the lower volume region 36" serve in this arrangement for the protection of the passengers of a motor vehicle. The connection of the two parts 31, 32 along the central one of the three parallel attachment sections 33' brings about a subdivision into an upper and lower volume region 36, 36" respectively and thus a restriction of the width of the inflated total volume.

Through the two narrow outer attachment sections 33' an intentional enlargement of the volume of the upper volume 36 or of the lower volume 36" can be brought about: If the gas pressure within one of the named regions 36, 36" undesirably exceeds a specific value, then the connection to the corresponding attachment section 33' tears. In this way, the volume of an additional auxiliary volume region 35' is in each case available for the lowering of the gas pressure. This additional safety effect can also be achieved if the two parts 31, 32 are less strongly welded at the outer attachment sections 33', for example, if only the respective attachment section 33' but not the associated connection section 34' is coated with PU.

FIG. 4 shows schematically a first airbag part 41 with a second airbag part 42 arranged behind it. Both parts are formed as rectangular sections of an airbag envelope of approximately the same size. The front airbag part 41 has at its side facing the rear airbag part 42 an attachment section 43 extending along its marginal zone and also a further attachment section 44 in its inner region in the form of a closed square ring. These two attachment sections 44, 44' are shown in broken lines in FIG. 4. The rear airbag part 42 has at its side confronting the front part 41 in FIG. 4, non-visible connection sections of the same shape as the two attachment sections 43, 44'.

Through the method of the invention, the two airbag parts 41, 42 are connected along the attachment sections 43, 44. By inflation of the region between the two parts 41 surrounded by the two attachment sections 43, 44, through an inflation opening which is not shown in FIG. 4, an inflated airbag arises which surrounds a non-inflated area zone 45 bounded by the attachment section 44. This bounded region 45 can serve as an interception area for passengers within a motor vehicle or for objects penetrating into a vehicle.

The manufacture of an airbag of this kind with an interception area 45 bounded by the attachment section 44 is particularly simple through the method of invention because the connection along the attachment section 44 can take place simultaneously to a further connection of the two parts 41, 42 along the attachment section 43. In this arrangement it is in particular possible to provide the entire region 45 bounded by the attachment section 44 as a connection surface.

Figure 5A:
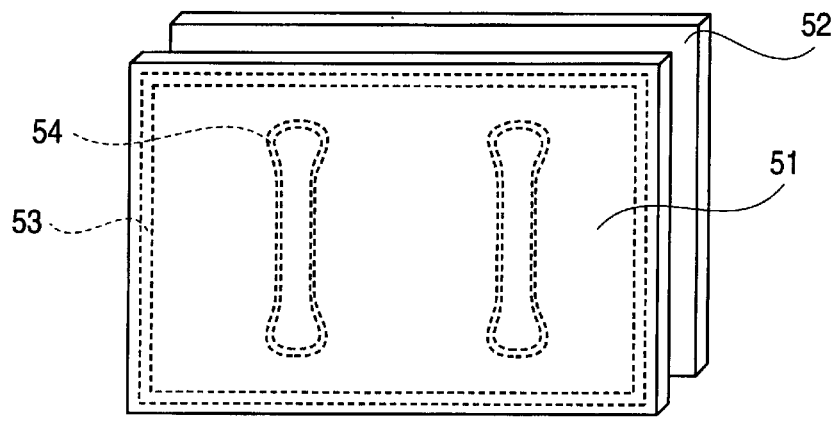
Figure 5B:
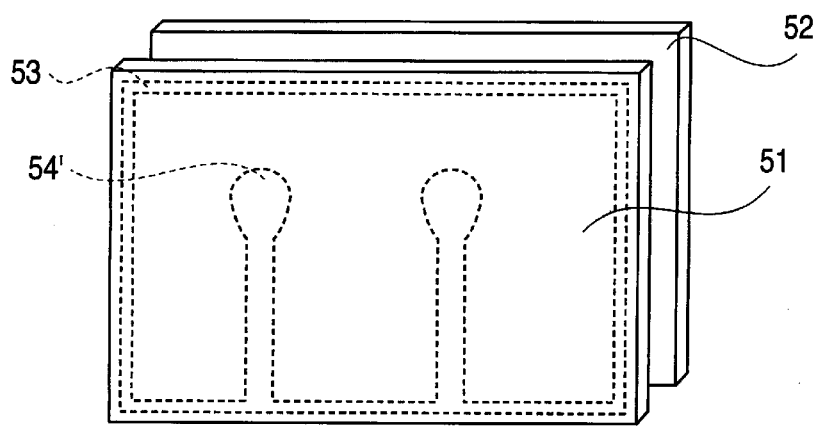

In FIGS. 5a and 5b there are respectively shown a front and a rear airbag part 51 and 52 respectively which are in each case formed as a rectangular section of an airbag envelope. The two parts 51, 52 are connected to one another amongst other things along an attachment section 53 which extends along the marginal region of the side of the front part 51, confronting the rear part 52 and which has a small lateral extent. In FIGS. 5a and 5b the attachment section 53 is shown in broken lines. An inflation opening which is not shown in FIGS. 5a and 5b is provided for the inflation of the resulting airbag.

The envelope part 51 shown in FIG. 5a also has two attachment sections 54 arranged in its inner region with the shape of the outline of a bone. Each attachment section 54 broadens at its end into a circular shape.

The two airbag parts 51, 52 shown in FIG. 5b are not only connected to one another along the surrounding attachment section 53, but also along two attachment sections 54' which project from a marginal region into the inner region of the front part 51. The two attachment sections 54 each have the shape of a half bone and merge at their lower side into the surrounding attachment section 53.

The attachment sections 54, 54' shown in FIGS. 5a and 5b enable a segmentation of the airbag into individual chambers which prevent an inflation of the airbag to an undesired width. Through the round shape of the end of the attachment sections 54, 54', which enable small radii of curvature to be avoided, forces acting at the attachment sections 54, 54' are distributed so that a tearing opening of the connection is prevented even with high tensile loading or pressure loading.

The production of a connection of the two parts 51, 52 along the attachment sections 53 and 54 and 54' can take place in accordance with the method of the invention simultaneously during a single manufacturing step and is thus particularly simple.

REFERENCE NUMERAL LIST 11 airbag part
12 airbag part
13 attachment section
14 inflation opening
15 connection section
16 rear side
21 airbag part
22 airbag part
23 airbag part
24 attachment section
25 connection section
26 attachment section
27 connection section
28 volume region
31 airbag part
32 airbag part
33 upper attachment section
33' parallel attachment section
34 upper connection section
34' parallel connection section
35 upper volume section
35' narrow volume section
35" lower volume section
36 upper volume region
36' auxiliary volume region
36" lower volume region
41 airbag part
42 airbag part
43 surrounding attachment section
44 attachment section
45 area zone
51 airbag part
52 airbag part
53 surrounding attachment section
54 attachment section
54' attachment section The priority document here, German Patent Application No. DE 197 39 558.9 filed on Sep. 9, 1998, is hereby incorporated by reference.

What is claimed is:

1. A method of manufacturing an airbag comprising the steps of:
   (a) positioning a first air bag part having at least two connection sections in an opposing relationship to a second air bag part having at least two attachment sections, the attachment and connection sections also opposing each other;
   (b) coating at least one opposing surface of the first and second air bag parts with polyurethane, wherein the connection or attachment sections located on the at least one opposing surface are coated as well;
   (c) contacting the opposing connection and attachment sections with each other; and
   (d) heating the first and second air bag parts to thereby weld the first and second airbag parts together at the attachment and connection sections to form an inflatable region between the first and second air bag parts and a first non-inflatable region located within the inflatable region.

2. The method of claim 1, wherein the first non-inflatable region has the outline of a bone.

3. The method of claim 1, wherein the step of heating the first and second air bag parts includes heating each of the attachment and connection sections.

4. The method of claim 1, wherein the shape of the first and second air bag parts is rectangular.

5. The method of claim 1, wherein the attachment and connection sections are positioned so that the non-inflatable region has a rectangular shape.

6. The method of claim 1, further comprising the step of:
   (e) positioning a third set of opposing attachment and connection sections so that heating the first and second air bag parts forms a second non-inflatable region located within the inflatable region.

7. The method of claim 6, wherein the second non-inflatable region has the shape of a bone.

8. The method of claim 1, wherein the first and second air bag parts are welded together around a majority of an outer perimeter of the first and second air bag parts.

9. The method of claim 8, wherein the attachment and connection sections are positioned so that the non-inflatable region has a rectangular shape.

10. The method of claim 8, wherein the attachment and connection sections are positioned so that the non-inflatable region has a bone shape.

11. The method of claim 8, wherein the welded attachment and connection sections forming the inflatable region are integrally connected with the attachment and connection sections forming the non-inflatable region.

12. The method of claim 8, wherein the attachment and connection sections are postioned so that the non-inflatable region has the shape of a half-bone.

13. A method of manufacturing an airbag comprising the steps of:
   (a) providing a single piece air bag envelope;
   (b) coating at least one side of the air bag envelope with polyurethane;
   (c) arranging the air bag envelope to form a first air bag part having an attachment section and a second air bag part having a connection section, wherein the first and second air bag parts are integrally connected and wherein the coated sides of each part are opposing and each of the attachment and connection sections are located at the periphery of the first and second air bag parts respectively;
   (d) positioning a first parallel attachment section on the first air bag part and a first parallel connection section on the second air bag part, the first parallel attachment section being positioned opposite to the first parallel connection section;
   (e) positioning the attachment section located at the periphery of the first air bag part in contact with the connection section located at the periphery of the second air bag part;
   (f) positioning the first parallel attachment section in contact with the first parallel connection section; and;
   (g) heating the air bag envelope to thereby weld the attachment and connection sections together forming first and second inflatable regions divided by the first parallel connection and attachment sections.

14. The method of claim 13, wherein the step of heating the air bag envelope includes heating each of the attachment sections.

15. The method of claim 13, wherein the step of heating the air bag envelope includes heating each of the connection sections.

16. The method of claim 13, wherein the step of heating the air bag envelope includes heating each of the attachment and connection sections.

17. The method of claim 13, wherein the step of coating the air bag envelope includes coating each of the attachment sections.

18. The method of claim 13, wherein the step of coating the air bag envelope includes coating each of the connection sections.

19. The method of claim 13, wherein the step of coating the air bag envelope includes coating each of the attachment and the connection sections.

20. The method of claim 13, further comprising the step of positioning a second parallel attachment section on the first air bag part and a second parallel connection section on the second air bag part adjacent the first parallel attachment and connection sections, wherein the step of heating the air bag envelope welds the second parallel attachment and connection sections together to thereby reduce the size of the first inflatable region.

21. The method of claim 20, wherein the strength of the weld between the second parallel attachment and connection sections is less than the strength of the weld between the peripheral attachment and connection sections located on the periphery of the air bag parts.

22. The method of claim 20, further comprising the step of positioning a third parallel attachment section on the first air bag part and a third parallel connection section on the second air bag part adjacent the first parallel attachment and connection sections, wherein the step of heating the air bag envelope welds the third parallel attachment and connection sections together to thereby reduce the size of the second inflatable region.

23. The method of claim 22, wherein the strength of the weld between the third parallel attachment and connection sections is less than the strength of the weld between the peripheral attachment and connection sections.

* * * * *